Dec. 25, 1962  R. W. BARES  3,069,951
CUTTING TOOL FOR PARTITION WALLS OF MULTIPLE TUBE HOSE
Filed April 10, 1961  2 Sheets-Sheet 1
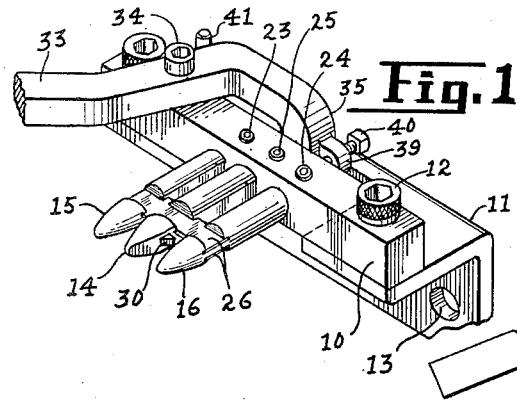
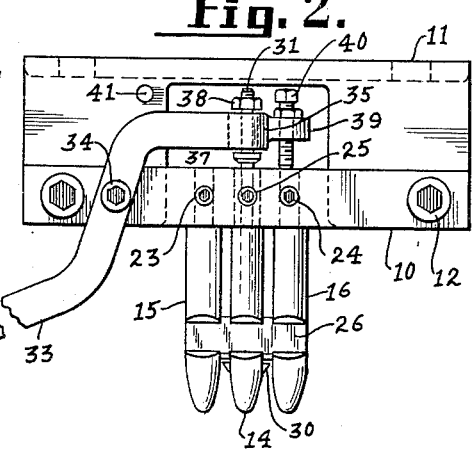
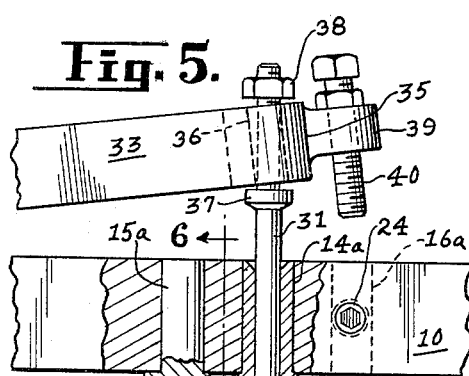
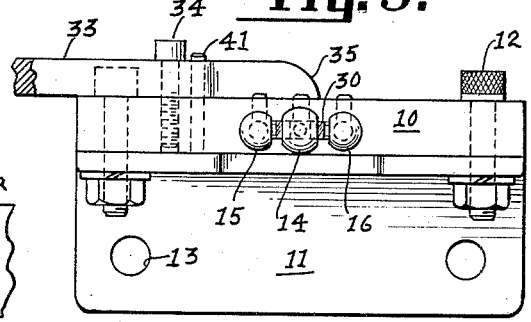
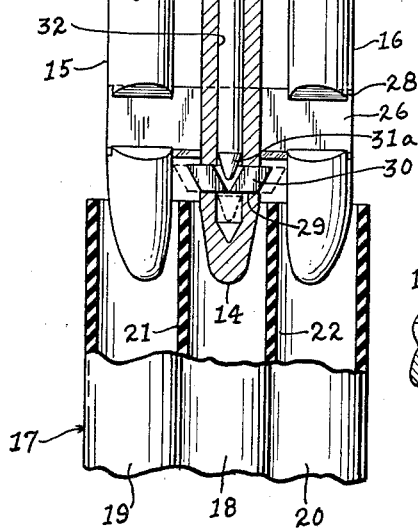
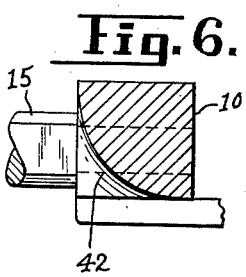
INVENTOR
*Richard W. Bares*
BY
*H. F. Johnston*
ATTORNEY Dec. 25, 1962   R. W. BARES   3,069,951
CUTTING TOOL FOR PARTITION WALLS OF MULTIPLE TUBE HOSE
Filed April 10, 1961   2 Sheets-Sheet 2

INVENTOR
Richard W. Bares
BY
H. F. Johnston
ATTORNEY

United States Patent Office 3,069,951
Patented Dec. 25, 1962

3,069,951
CUTTING TOOL FOR PARTITION WALLS OF MULTIPLE TUBE HOSE
Richard W. Bares, Oakville, Conn., assignor to Scovill Manufacturing Company, Waterbury, Conn., a corporation of Connecticut
Filed Apr. 10, 1961, Ser. No. 101,744
5 Claims. (Cl. 83—184)

This invention relates to a cutting tool and more particularly to a tool for cutting out the partition walls of a multiple tube hose preliminary to attaching a coupling thereto, which hose is known to the trade as soaker hose.

Heretofore in preparing the end of a multiple tube hose for receiving a coupling, it was customary to provide a single intermediate slit in each partition wall. This left considerable material to be squeezed within the coupling and frequently resulted in an unsatisfactory joint. It was also customary to double slit each partition wall and then attempt to remove the slit tongue or stock by a pulling operation in order to break the tongue away from the tubing material. This was unsatisfactory because it left a ragged edge and there was no way to determine the position the slit tongue would break away from the partition wall.

It is the principal object of my invention to provide a tool that will double slit the partition wall and then transversely cut the inner end of the slit stock or tongue so that the complete tongue can be removed from the hose when the latter is withdrawn from the cutting tool.

The full nature of this invention along with the other objects and various advantages thereof, will be more apparent from a consideration of the following description when read in connection with the accompanying drawing, in which:

FIG. 1 is a perspective view of the cutting tool embodying my invention;

FIG. 2 is a plan view of the same;

FIG. 3 is a front elevational view of the same;

FIG. 4 is an end view as it would appear from the right side of FIG. 3;

FIG. 5 is a partial plan and partial sectional view at the mid-portion of the cutting tool on a larger scale showing the transverse shearing knives and the operating plunger as they appear in retracted position;

FIG. 6 is a transverse cross-sectional view on line 6—6 of FIG. 5; and

Figure 7:
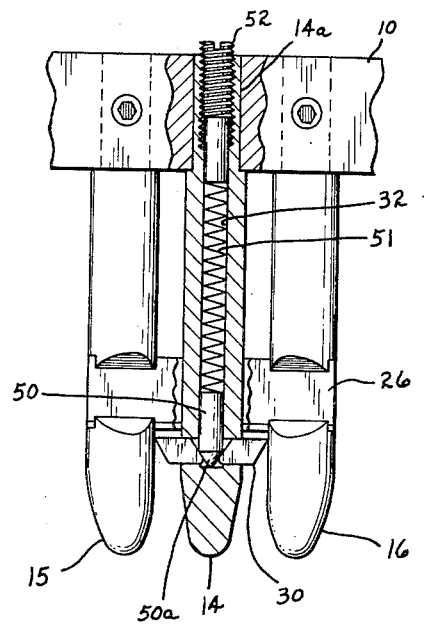
FIG. 7 is a view similar to FIG. 5 showing a modified form.

Referring now to the drawing, the numeral 10 designates a finger-support block attached to one wing of an angle bracket 11 as by bolts 12. The other wing is provided with spaced openings 13 through which the bolts or screws may be inserted for attaching the cutting tool to a bench or other support.

Projecting forwardly of the front face of the support block 10 are three laterally spaced hose-engaging fingers— a central finger 14 and two outside fingers 15 and 16. The leading end of each of these fingers is formed with tapering surfaces to facilitate guiding the fingers into the hollow tubes of a multiple tube hose 17 as shown in FIG. 5. The hose as here shown is of the triple type having a mid tube 18 and side tubes 19 and 20 integrally joined together with partition walls 21 and 22 therebetween. The opposite or inner ends of the outside fingers 15 and 16 are formed with reduced shanks 15a and 16a adapted to be fitted in suitable openings in the support block 10 and anchored thereinplace by set screws 23 and 24. Similarly, the central finger 14 is provided with a reduced shank 14a fitted into a corresponding opening in block 10 and anchored by set screw 25.

For the purpose of cutting out a portion of the hose partition walls 21 and 22, a pair of vertically spaced cutting blades 26 is transversely supported on the three fingers 14, 15 and 16 a suitable distance ahead of the support block 10 as determined by the length of the tongue to be cut from the partition walls. The blades 26 may be conventional razor blades such as the Schick type. As best seen in FIG. 4, each finger is milled from above and below to provide horizontal flats 27 against which the blades 26 are positioned, and each finger is provided with saw slots as indicated at 28 into which the blades 26 may be slid endwise when making the assembly. Also, as seen in FIGS. 1 and 3, the central finger 14 is provided with vertical flats on its opposite side throughout its length. Similarly, each adjacent wall of the outside fingers 15 and 16 is formed with vertical flats to provide adequate clearance for the partition walls 21 and 22 of the hose when forced over said fingers.

A pair of laterally movable shearing knives 30 is provided to shear off the tongues cut from the hose partition walls. The knives 30 are of angular shape and are mounted to slide laterally in a transverse recess 29 provided in the central finger 14 ahead of the blades 26. Movement is imparted to the knives 30 by a plunger 31 slidable in an axial bore 32 in the central finger 14. The inner end of the plunger 31 is formed with a tapered end 31a which cams against the inclined surfaces of the knives 30 in forcing them outwardly in their respective recess.

The plunger 31 is actuated by a handle lever 33 mounted to pivot on the top of the support block 10 around a pivot screw 34. The inner end of the lever 33 is formed with a downward projection 35 having an enlarged opening 36 therein through which the plunger 31 extends. Inwardly of the lever downward projection 35, the plunger 31 is formed with an integral shoulder 37, and the outer end of said plunger is threaded to receive a nut 38. The downward projection 35 operates between the shoulder 37 and the nut 38 to impart reciprocal motion to the plunger 31 (see FIG. 5).

To control the inward movement of the plunger 31 to prevent jamming of the cutting edges of the knives 30 against the adjacent vertical flats of the end fingers 15 and 16, a flange extension 39 is formed on the handle downward projection 35. In the flange extension 39 is threaded an adjusting stop screw 40 adapted to abut against the rear face of the support block 10. The screw 40 may be adjusted to predetermine the amount of lateral movement of the knives 30. To limit the outer movement of the plunger 31, the outer stroke of the handle lever 33 may be checked by a stop pin 41 extending upwardly from the upper wing of the angle bracket 11.

Operation

In the operation of the cutting tool, the handle lever 33 will first be moved in a counter-clockwise direction about the pivot screw 34 to retract the plunger 31 to the full line position shown in FIG. 5, thus leaving the knives 30 free to move inwardly. The multiple tube hose 17 will be held in front of the tool so that the mid tube 18 and the side tubes 19 and 20 will line up respectively with the fingers 14, 15 and 16. The hose 17 then will be pushed over the fingers to a position where the leading end of the hose abuts the front face of the support block 10 and during this movement, the spaced blades 26 will skive a tongue from the partition walls 21 and 22 of said hose. The hose will next be withdrawn a slight distance along the fingers and finally, the handle 33 will be operated to force the plunger 31 downwardly to the dotted line position shown in FIG. 5, thus forcing the knives 30 outwardly against the vertical flats of the outer fingers 15 and 16 to sever completely the slit tongues from the wall partitions 21 and 22. The hose 17 may then be withdrawn from the tool to permit a hose coupling to be assembled thereto without any interference from the partition walls.

The tongues sheared from the hose 17 will, of course, be lodged between the two blades 26, but when another hose is pushed over the fingers, the partition walls will force out the previously severed tongues from between the blades. To deflect the previously severed tongues from the cutting tool, the front surface of the support block 10 is milled between the fingers to provide arcuate channels 42 as shown in FIG. 6.

In the modified construction shown in FIG. 7, the cutting tool is substantially the same as the first form except that the operating handle 33 and all associated parts are dispensed with, and the laterally slidable shearing knives 30 are tensioned outwardly at all times so as to work automatically.

In the FIG. 7 construction, the fingers 14, 15 and 16 and the support block 10 are the same as the first form. A relatively short plunger 50 is slidable in bore 32 and is provided with a tapered end 50a which is always in contact with the adjacent beveled surfaces of the shearing knives 30. The plunger 50 is tensioned downwardly against the knives 30 by a light coil spring 51 positioned in bore 32, and the tension of the spring 51 can be varied by an adjusting set screw 52 threaded into the shank 14a of the central finger 14. It will be noted that in this form, the cutting edges of the knives 30 will normally be in contact with the adjacent flat faces of the outside fingers 15 and 16.

In the operation of this latter form, when the hose 17 is initially forced upon the tool, the leading end of the partition walls will contact the inclined walls of the knives 30 forcing them inwardly while the hose is being slipped its full distance up to the support block 10 and slitting tongues in the partition walls by reason of the blades 26. As soon as the hose 17 is withdrawn, the knives 30, under constant outward tension, will function to sever said tongues from the partition walls. In this form, the operator can use both hands to withdraw the hose from the tool, whereas in the first form, the operation can use only one hand for withdrawing the hose while the other hand is used to swing the handle lever 33 for operating the knives 30.

While I have herein described and shown two illustrative embodiments of my invention to accommodate a triple tube hose, it is to be understood that the invention is not limited thereto but may comprehend other construction and arrangements. For instance, the tool could be constructed to accommodate a quadruple tube hose by having two central fingers with laterally shearing knives and an operating plunger; or the tool could be made to accommodate a double tube hose by having only two fingers with one finger providing a single laterally operating shearing knife and operating plunger.

What I claim is:

1. A web-cutting tool for cutting out the partition walls of a multiple tube hose preliminary to attaching a coupling to the end of such hose, said tool comprising a support block, a plurality of laterally spaced fingers projecting from one face of said block and adapted to enter the separate tubes of said hose, a pair of vertically spaced cutting blades supported transversely of said fingers forwardly of said block, said blades extending laterally across the spaces between said fingers for the purpose of providing a double slit in the partition walls between the tubes of said multiple hose when the latter is forced over said fingers, laterally movable shearing means mounted to move in a transverse slot provided in at least one intermediate finger and positioned ahead of said cutting blades, and means for operating said shearing means transversely for the purpose of cutting the hose partition walls adjacent the inner slitted portion of said walls.

2. A web-cutting tool for cutting out the partition walls of a multiple tube hose preliminary to attaching a coupling to the end of such hose, said tool comprising a support block, a plurality of laterally spaced fingers projecting from one face of said block and adapted to enter the separate tubes of said hose, a pair of vertically spaced cutting blades supported transversely of said fingers forwardly of said block, said blades extending laterally across the spaces between said fingers for the purpose of providing a double slit in the partition walls between the tubes of said multiple hose when the latter is forced over said fingers, one of said fingers having a transverse slot thereacross ahead of said cutting blades, a shearing knife mounted to slide laterally in said transverse slot and to co-act with the adjacent wall of another finger to sever the tongue material between said slits previously cut in the hose partition walls by said cutting blades, and means for actuating said laterally movable shearing knife.

3. A web-cutting tool for cutting out the partition walls of a multiple tube hose preliminary to attaching a coupling to the end of such hose, said tool comprising a support block, three laterally spaced fingers—a central finger and outside fingers—projecting from one face of said block and adapted to enter the separate tubes of said hose, a pair of vertically spaced cutting blades supported transversely of said fingers forwardly of said block, said blades extending laterally across the spaces between said fingers for the purpose of providing a double slit in the partition walls between the tubes of said multiple hose when the latter is forced over said fingers, the central finger having a transverse slot thereacross ahead of said cutting blades, a pair of shearing knives mounted to slide laterally in said transverse slot and to co-act with the adjacent walls of the outside fingers to sever the sections of wall material previously cut in the hose partition walls by said cutting blade, and means for actuating said laterally movable shearing knives.

4. A web-cutting tool as defined in claim 3 wherein the means for actuating the shearing knives consists of a plunger slideable in said one finger and a handle lever pivotally mounted on said support for operating said plunger.

5. A web-cutting tool as defined in claim 4 wherein the means for actuating the shearing knives consists of a spring-actuated plunger normally urging said knives outwardly in their transverse slot.

References Cited in the file of this patent
UNITED STATES PATENTS
2,915,932    Gross _____ Dec. 8, 1959
FOREIGN PATENTS
692,708    Great Britain _____ June 10, 1953